(12) United States Patent
Wu

(10) Patent No.: US 8,720,303 B2
(45) Date of Patent: May 13, 2014

(54) PIVOTING STRUCTURE FOR A BRAKE LEVER

(76) Inventor: Judy Wu, Changhua County (TW)

( * ) Notice: Subject to any disclaimer, the term of this patent is extended or adjusted under 35 U.S.C. 154(b) by 106 days.

(21) Appl. No.: 13/473,605

(22) Filed: May 17, 2012

(65) Prior Publication Data

US 2013/0247707 A1    Sep. 26, 2013

(30) Foreign Application Priority Data

Mar. 21, 2012   (TW) .............................. 101205117 A

(51) Int. Cl.
*G05G 1/04*   (2006.01)

(52) U.S. Cl.
USPC ............................................................ 74/523

(58) Field of Classification Search
USPC ......... 74/473.14, 473.15, 473.3, 473.31, 489, 74/501.6, 502.2, 523, 524; 192/99 S, 217; 188/72.9, 73.1, 73.34
IPC ................................... B62K 23/06; B62L 3/02
See application file for complete search history.

(56) References Cited

U.S. PATENT DOCUMENTS

| 6,647,823 | B2 * | 11/2003 | Tsumiyama et al. | ........ 74/501.6 |
| 6,725,740 | B2 * | 4/2004 | Dal Pra' | ........................ 74/502.2 |
| 7,721,622 | B2 * | 5/2010 | Wen | ................................ 74/523 |
| 7,788,990 | B2 * | 9/2010 | Carrara et al. | ............... 74/502.2 |
| 8,511,200 | B2 * | 8/2013 | Tsai et al. | ..................... 74/502.2 |
| 2012/0006146 | A1 * | 1/2012 | Warren et al. | ................... 74/524 |

FOREIGN PATENT DOCUMENTS

EP    1739001 A1 * 12/2008

* cited by examiner

*Primary Examiner* — Thomas R Hannon
*Assistant Examiner* — Adam D Rogers

(57) ABSTRACT

A pivoting structure for a brake lever includes a connector having one end connected to a handle of a bicycle and another end having a assembling space opened thereon; a brake lever having one end which is assembled to the assembling space; and a pivoting set having a horizontal shaft and a vertical shaft, one end of the horizontal shaft inserted through a wall of the assembling space, the vertical shaft passing through one end of the brake lever, another end of the horizontal shaft connected to the vertical shaft. Therefore, the brake lever is vertically and horizontally pivotable on the connector via the pivoting set.

5 Claims, 17 Drawing Sheets

PIVOTING STRUCTURE FOR A BRAKE LEVER

BACKGROUND OF THE INVENTION

1. Field of the Invention

The present invention relates to a pivoting structure and more particularly to a pivoting structure for a brake lever.

2. Description of Related Art

Bicycle activity is more and more popular in the 21st century because bicycle activity is eco-friendly, convenient and entertaining. Many enterprises encourage their employees to go to work by bicycles instead of driving vehicles today. Many people also go shopping or go traveling by bicycles during their leisure time. However, there are many traffic accidents which are attributed to faulty brakes in the world so that how to improve a structure for a brake lever becomes more and more important.

A conventional pivoting structure for a brake lever comprises a connector, a pivoting rod and a brake lever. The connector has a connecting part. The connecting part has a first pivoting hole opened therethrough. The brake lever has two pivoting members extended from one end thereof. Each pivoting member has a second pivoting hole opened therethrough. The second pivoting hole is corresponding to each first pivoting hole. The connecting part of the connector is set between the two pivoting members of the brake lever. The pivoting rod is inserted through the first pivoting hole of the connecting part and each second pivoting hole of each pivoting member. Therefore, the brake lever is pivoted on the connector via the pivoting rod. However, the convention pivoting structure for a brake lever still has a disadvantage as following:

When the bicycle is tipped down by the unexpected force, the brake lever of the bicycle would abut against the ground forcefully and the convention pivoting structure for a brake lever would be further broken.

The present invention has arisen to mitigate and/or obviate the disadvantages of the conventional pivoting structure. Further benefits and advantages of the present invention will become apparent after a careful reading of the detailed description with appropriate reference to the accompanying drawings.

SUMMARY OF THE INVENTION

The main objective of the present invention is to provide an improved pivoting structure.

To achieve the objective, a pivoting structure for a brake lever comprises a connector, one end of the connector connected to a handle of a bicycle or a motorcycle, another end of the connector having a assembling space opened thereon, a brake lever, one end of the brake lever defined as two pivoting members, one distance defined between the two pivoting members, the two pivoting members assembled to the assembling space, a pivoting set used to pivot the brake lever on the connector, the pivoting set having a horizontal shaft and a vertical shaft, one end of the horizontal shaft inserted through a wall of the assembling space, the vertical shaft passing through the two pivoting members of the brake lever and assembled between the two pivoting members, another end of the horizontal shaft connected to the vertical shaft between the two pivoting members. Wherein, a concave space is opened on the wall of the assembling space; the concave space is corresponding to one end of the horizontal shaft; the concave space is used to secure the horizontal shaft to the connector when the brake lever is pivoted; another end of the horizontal shaft is defined as two pivoting units; another distance is defined between the two pivoting units; the two pivoting units of the horizontal shaft are fitly assembled between the two pivoting members of the brake lever; the pivoting set further has a plurality of bearings, a connecting screw, a vertical spring and a horizontal spring; two of the bearings are respectively assembled on the two pivoting members of the brake lever and further respectively sleeve two ends of the vertical shaft; another bearing is assembled on the wall of the assembling space and further sleeves one end of the horizontal shaft; the connecting screw is screwed to a bottom end of the vertical shaft; the horizontal spring sleeves one end of the horizontal shaft; the vertical spring sleeves the vertical shaft between the two pivoting members; two sleeving rings sleeve one end of the horizontal shaft and respectively abut against two ends of the horizontal spring so as to prevent the horizontal shaft from axially moving when the brake lever is pivoted; two sleeving rings sleeve one end of the horizontal shaft and respectively abut against two ends of the horizontal spring so as to prevent the horizontal shaft from axially moving when the brake lever is pivoted; an adjusting screw is assembled between the two pivoting members of the brake lever; one end of the adjusting screw is set on the brake lever; another end of the adjusting screw abuts against another end of the horizontal shaft; the adjusting screw is used to adjust the distance between the brake lever and a handle of the bicycle.

Therefore, the brake lever is vertically and horizontally pivotable via the pivoting set, so that when the bicycle is tipped down by a outside force, although the brake lever of the bicycle would abut against the ground forcefully, the pivoting structure for a brake lever of the present invention would not be further broken.

A pivoting structure for a brake lever of the second embodiment of the present invention comprises a connector having an assembling space, a first through hole opened on a wall of the assembling space, a brake lever, one end of the brake lever defined as two pivoting members, a distance vertically defined between the two pivoting members, a pivoting set used to pivot the brake lever on the connector, the pivoting set having a vertical shaft, a horizontal shaft, a vertical spring and a horizontal spring, the vertical shaft passing through the two pivoting members of the brake lever and one end of the vertical shaft extended from one pivoting member, a second through hole opened on the middle portion of the vertical shaft between the two pivoting members, one end and another end of the horizontal shaft respectively inserted through the first through hole of the connector and the second through hole of the vertical shaft, one end of the horizontal shaft extended from the first through hole of the connector, the vertical spring sleeving one end of the vertical shaft, one end of the vertical spring connected to one pivoting member, the horizontal spring sleeving one end of the horizontal shaft, one end of the horizontal spring connected to the connector. Wherein, two bearings are respectively assembled on the two pivoting members; the two bearings further respectively sleeve two ends of the vertical shaft; two connecting screws are respectively inserted into another end of the vertical shaft and another end of the horizontal shaft so as to strengthen a structure of the pivoting set.

Therefore, when the brake lever is vertically pivoted or is horizontally pivoted, the horizontal spring or the vertical spring is twisted; after the brake lever is vertically pivoted or is horizontally pivoted, the horizontal spring or the vertical spring provides a recovery force to pivot the brake lever back to an original position.

Further benefits and advantages of the present invention will become apparent after a careful reading of the detailed description with appropriate reference to the accompanying drawings.

DETAILED DESCRIPTION OF THE INVENTION

Figure 1:
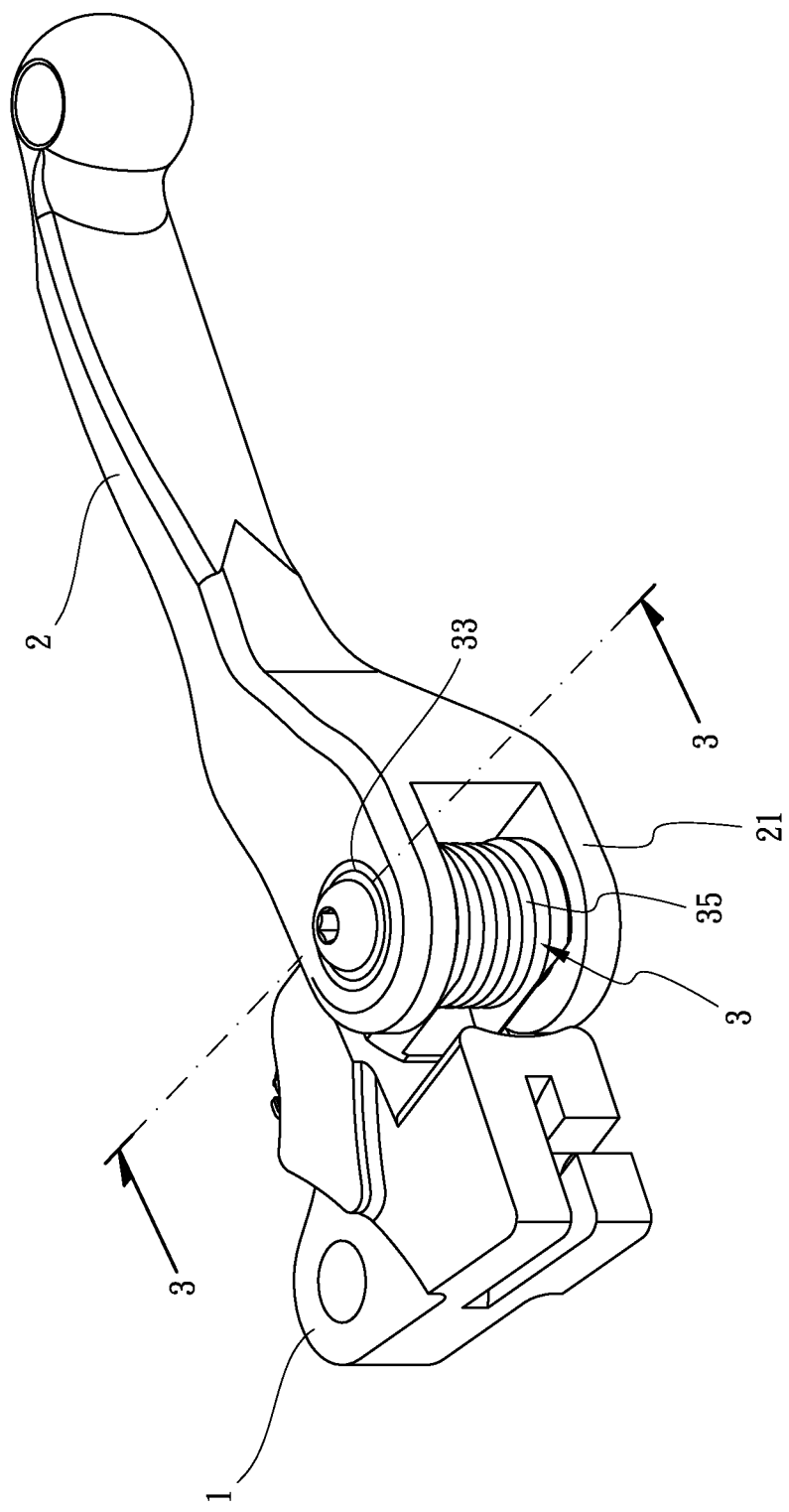
FIG. 1 is a perspective view of a pivoting structure for a brake lever of the present invention.
Figure 2:
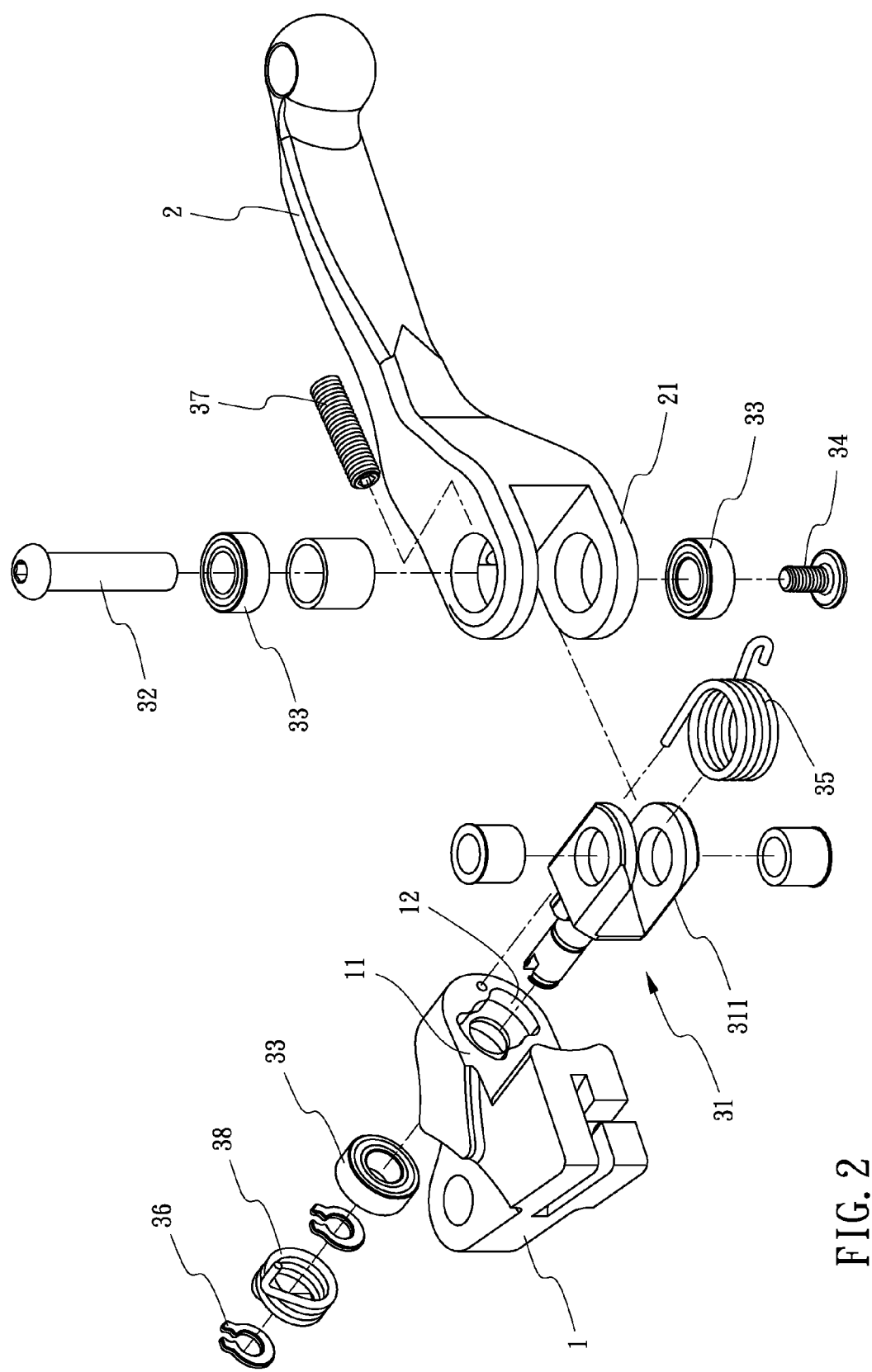
FIG. 2 is an exploded view of the pivoting structure for a brake lever of the present invention.
Figure 3:
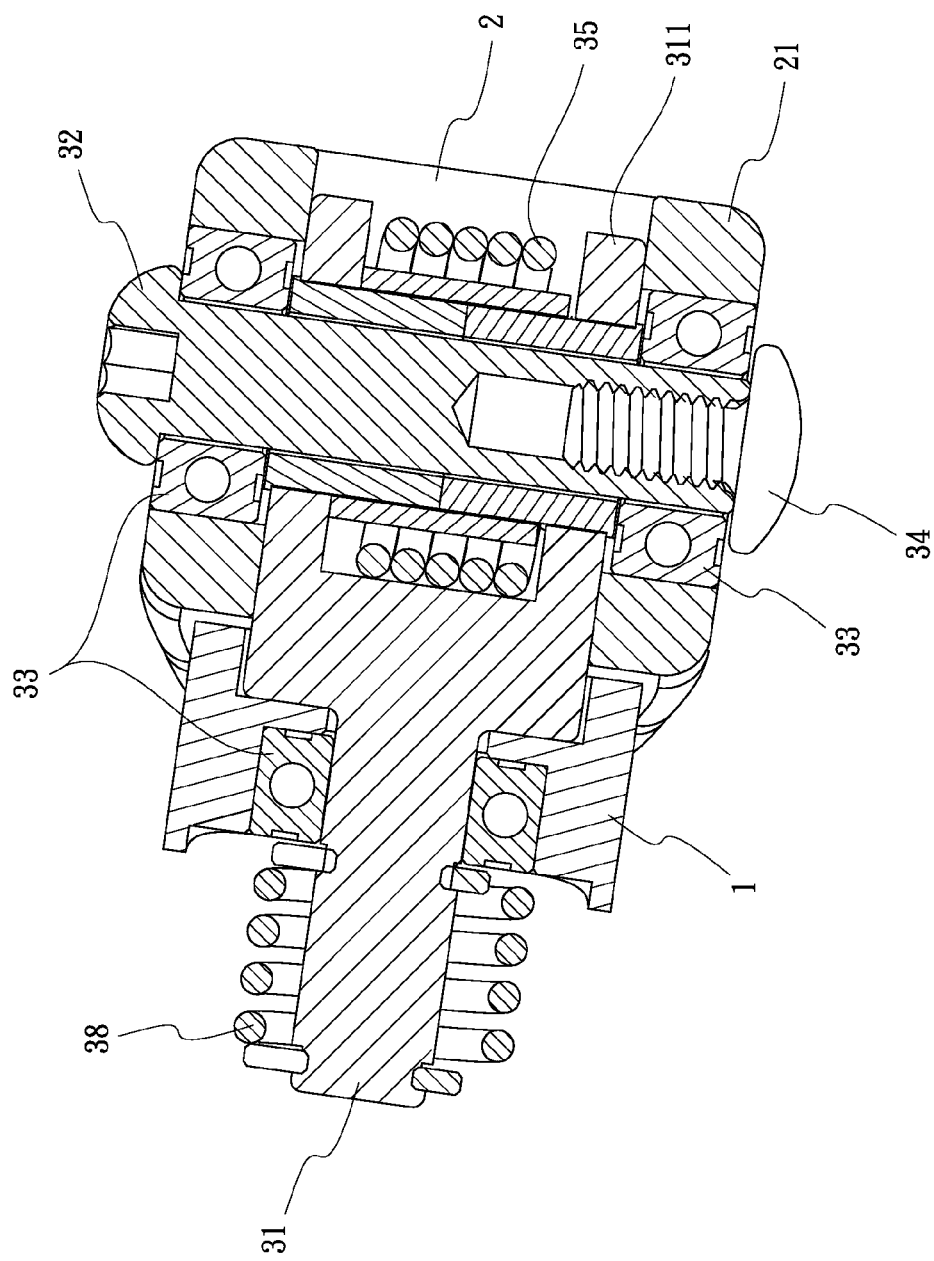
FIG. 3 is a cross-sectional view along a line 3-3 in FIG. 1 for showing a relationship between a connector, a brake lever and a pivoting set.
Figure 4:
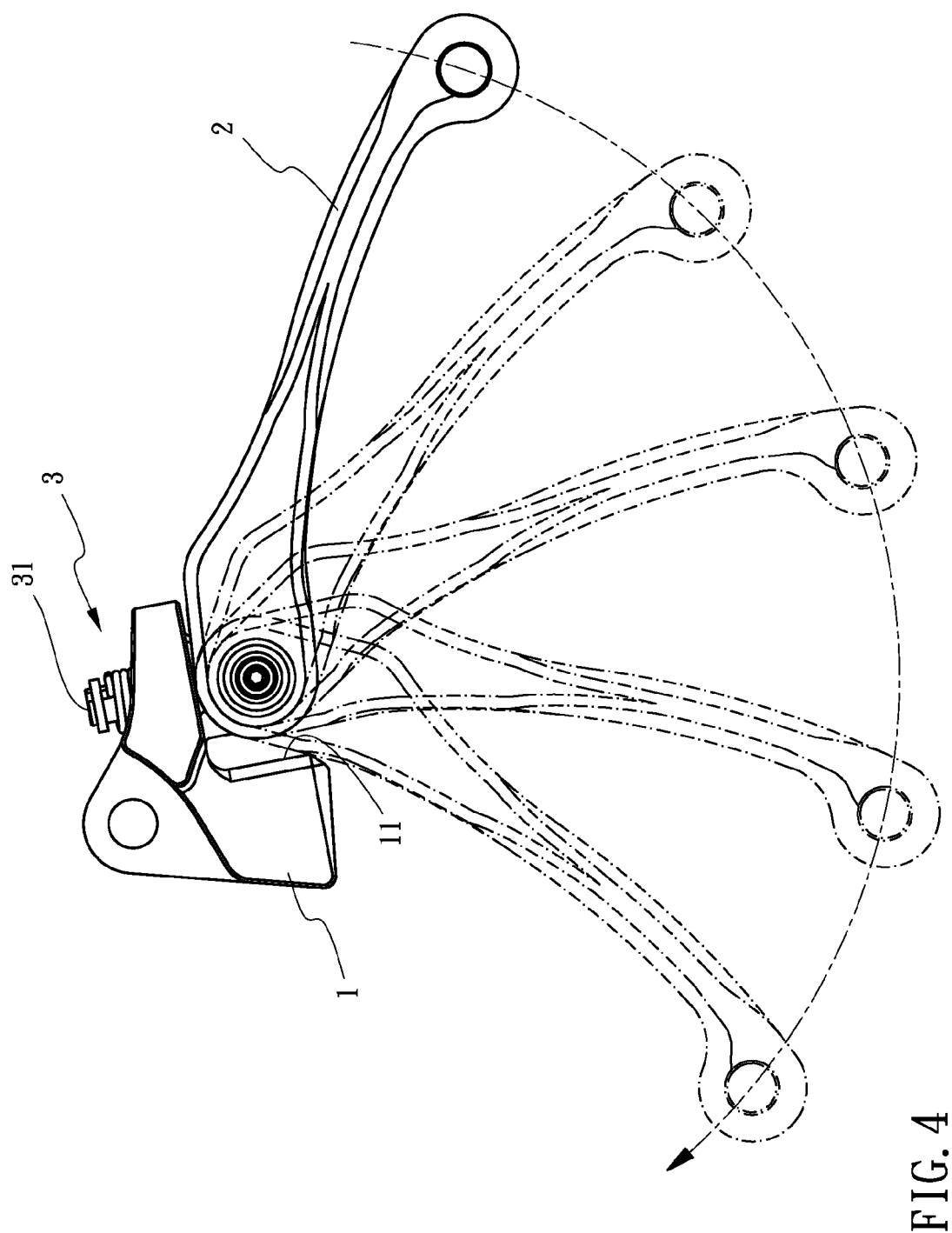
FIG. 4 is a top plan view for showing the brake lever which is horizontally pivoted.
Figure 5:
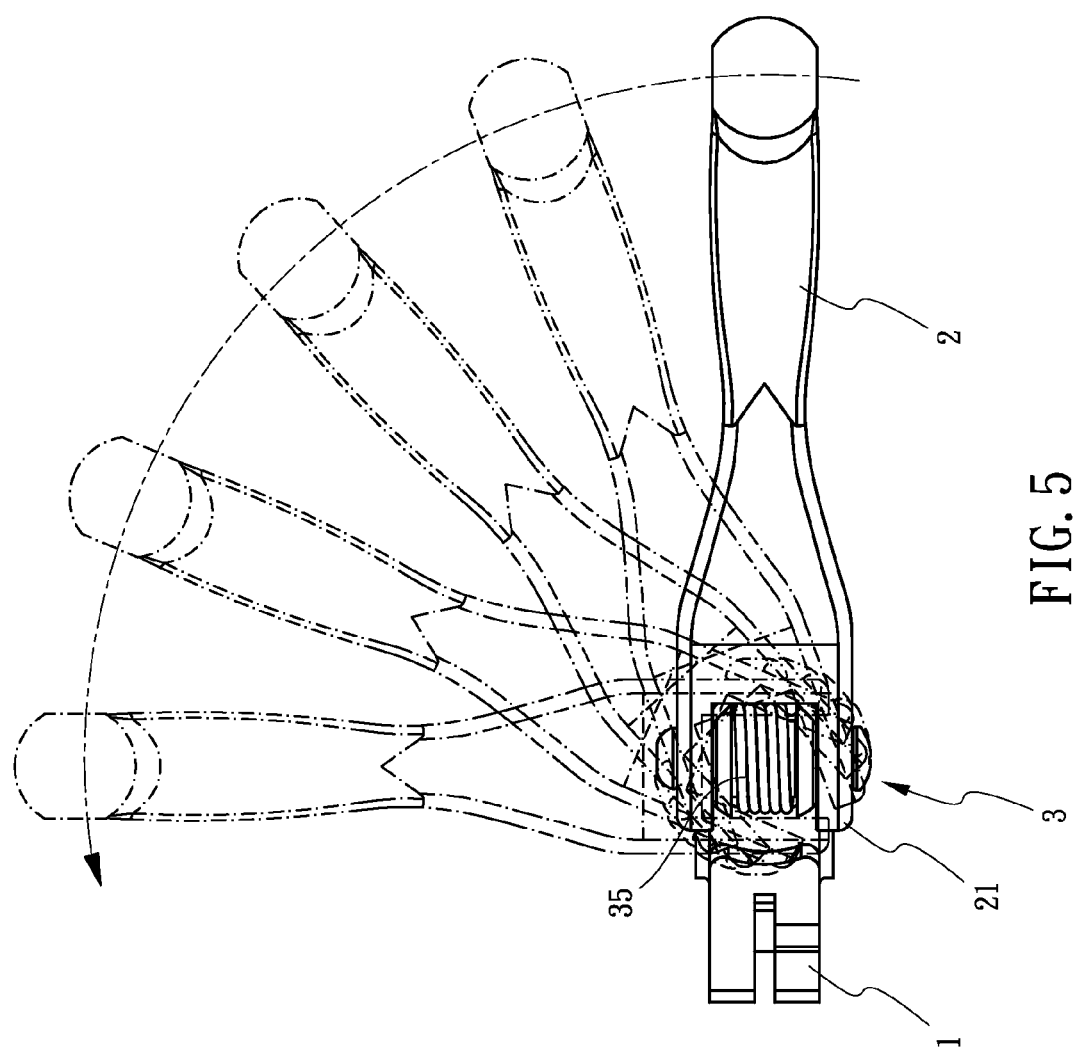
FIG. 5 is a front elevational view for showing the brake lever which is vertically pivoted.
Figure 6:
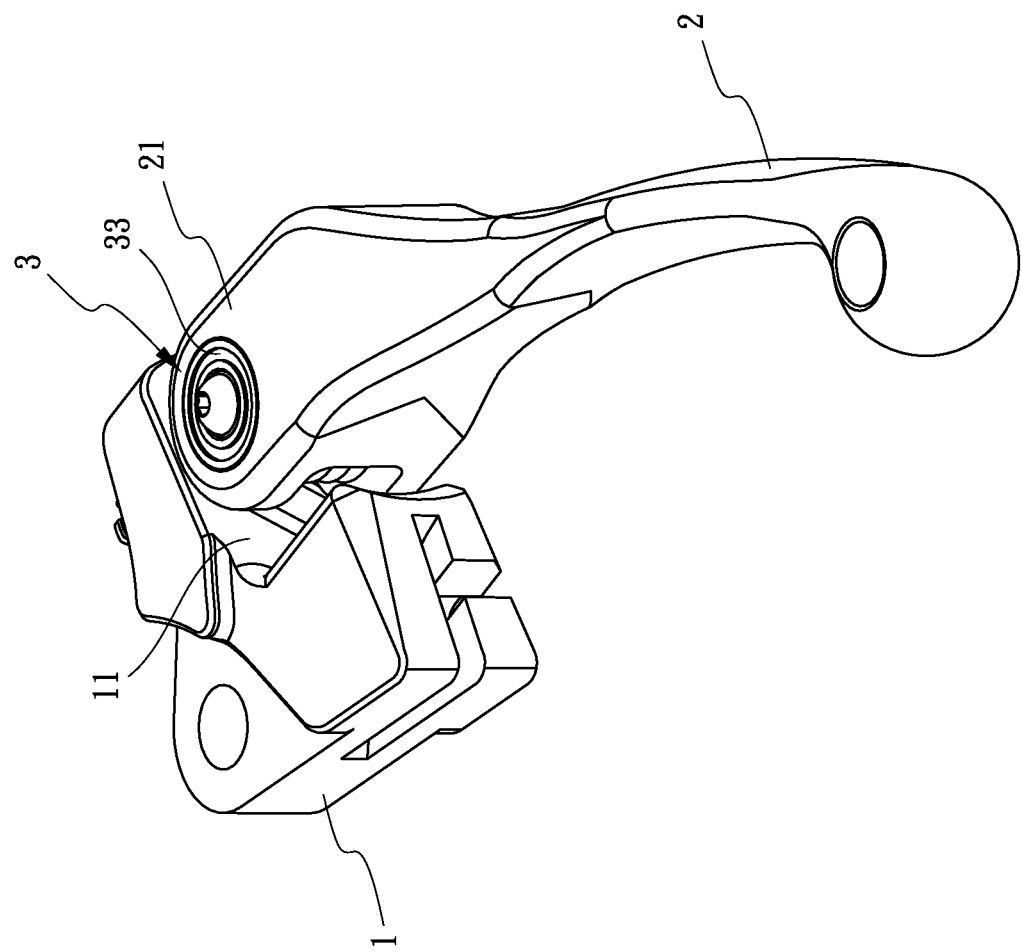
FIGS. 6 and 8b are perspective views for showing the brake lever which is horizontally pivoted.
Figure 7:
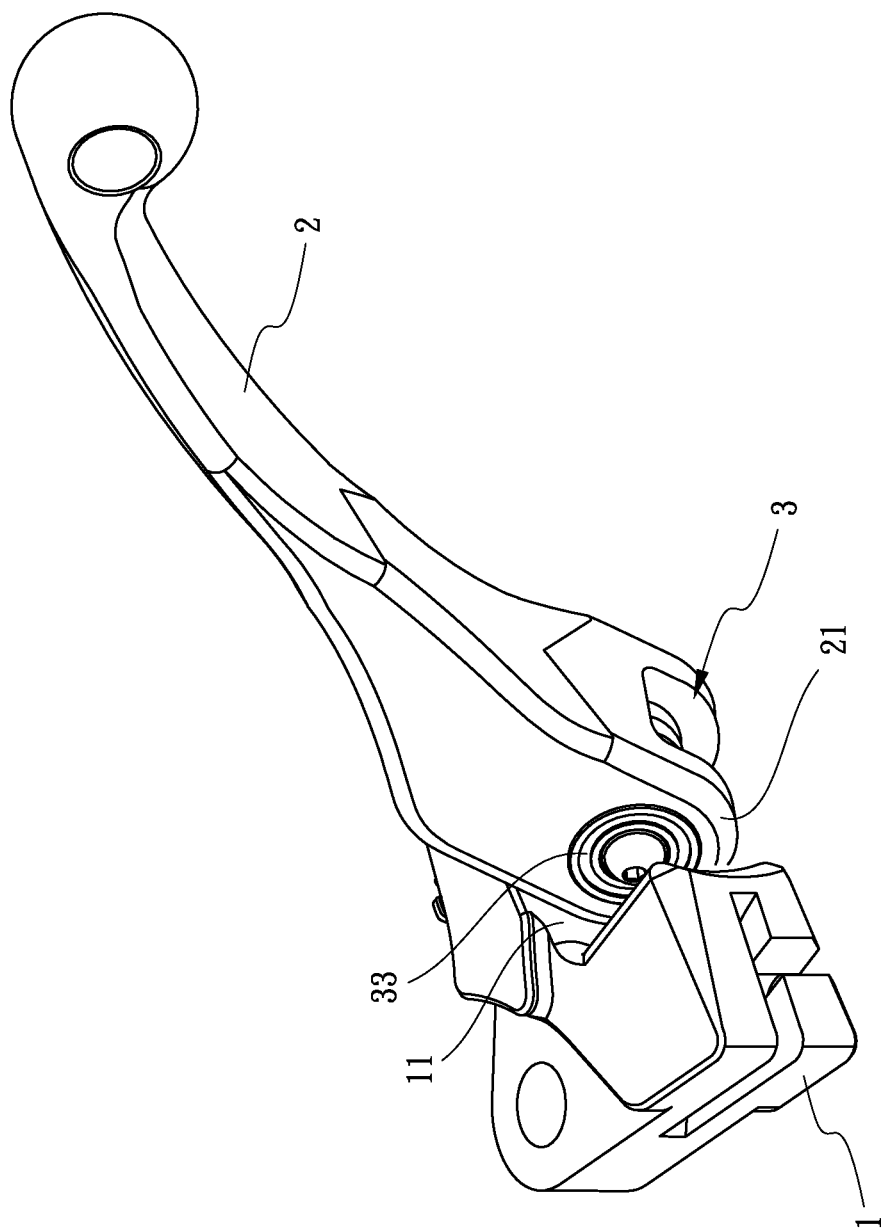
FIGS. 7 and 8a are perspective views for showing the brake lever which is vertically pivoted.
Figure 8:
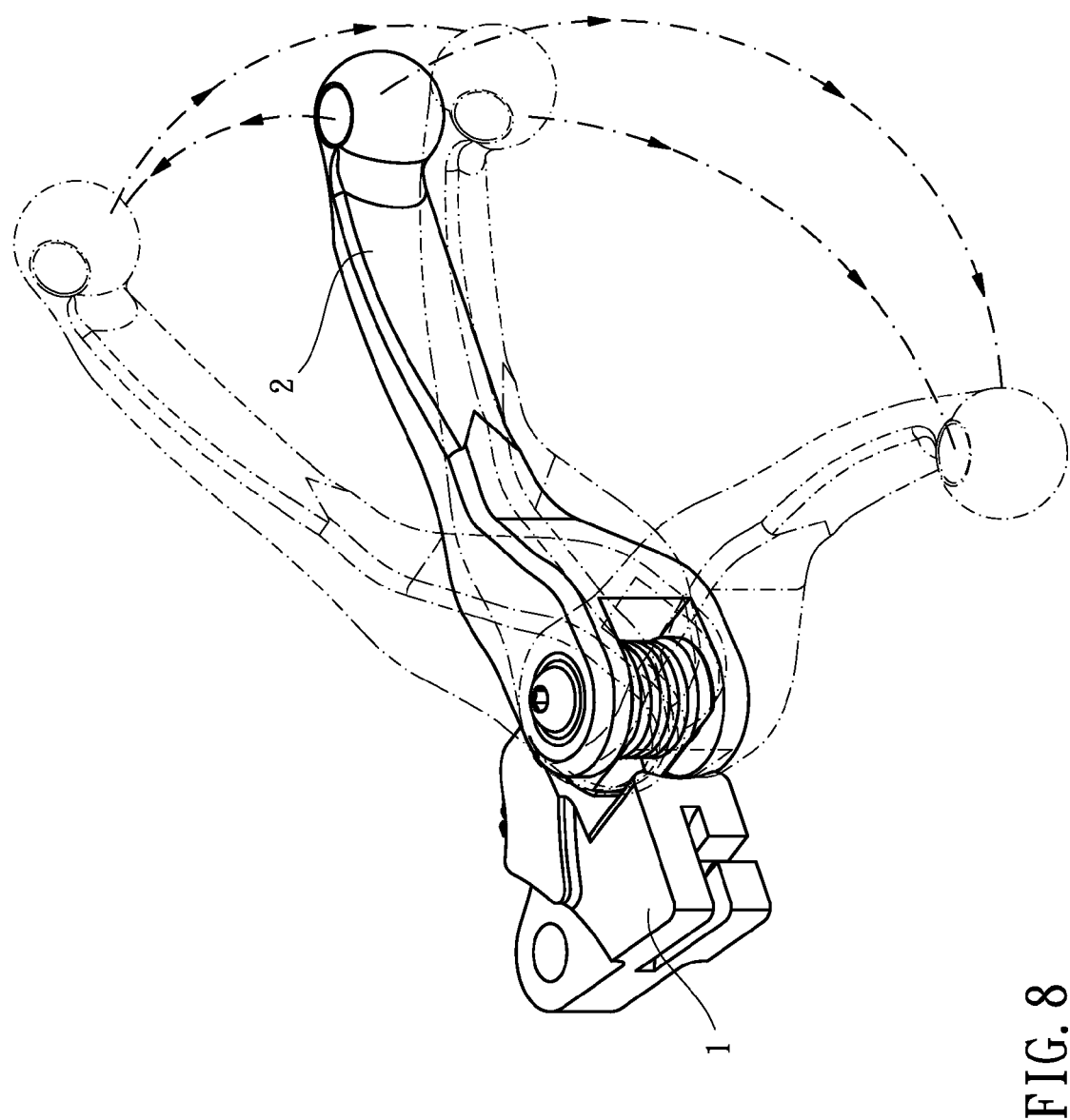
FIGS. 8 and 8c are perspective views for showing the brake lever which is horizontally and vertically pivoted.
Figure 8A:
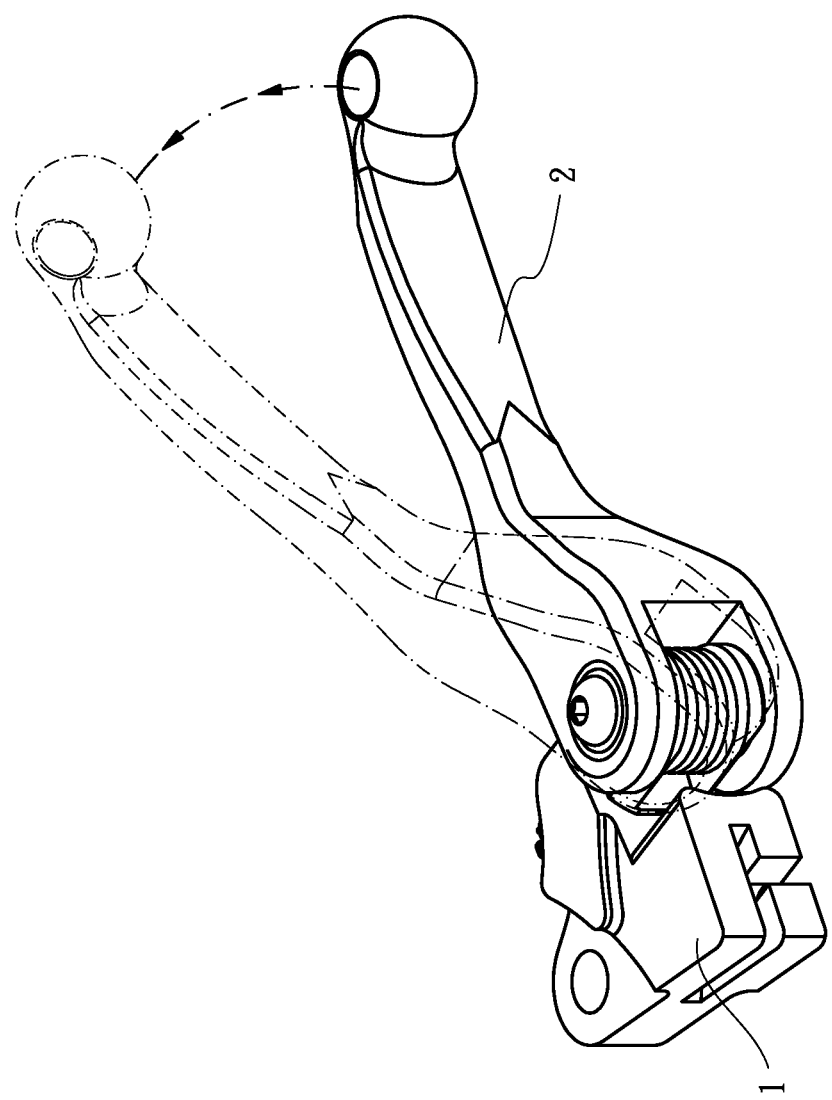
Figure 8B:
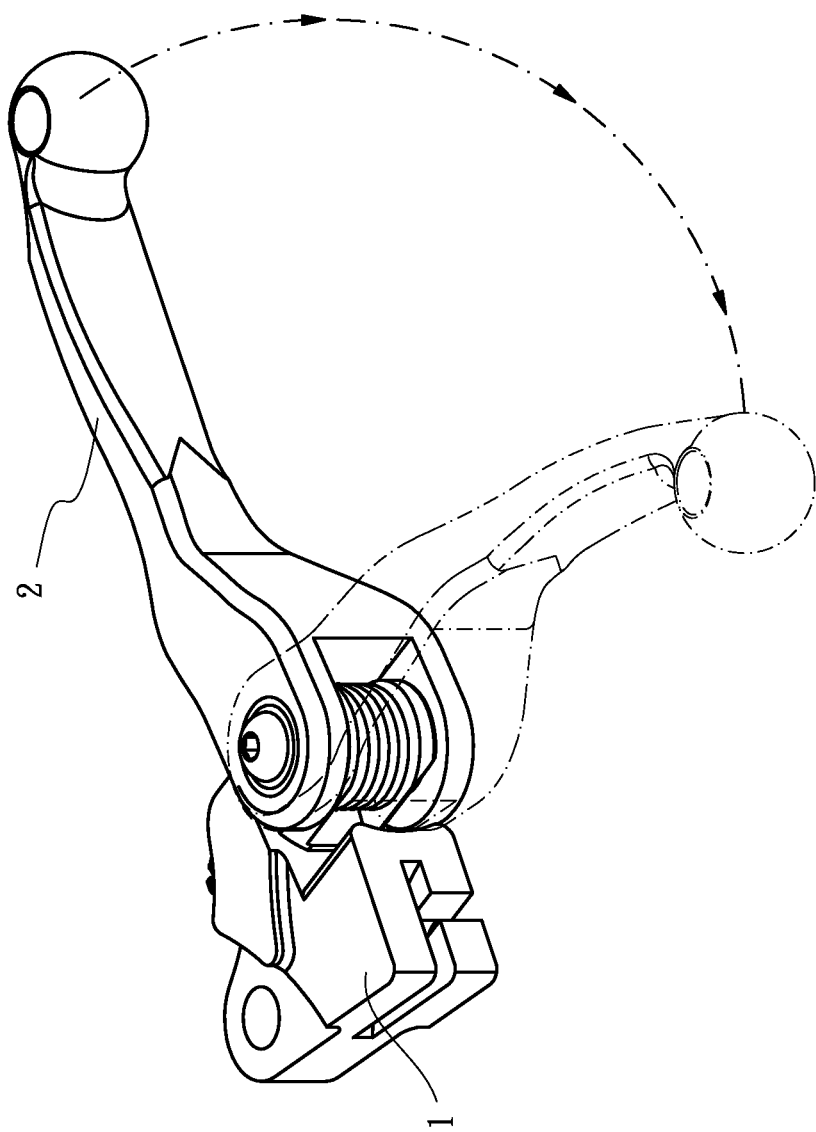
Figure 8C:
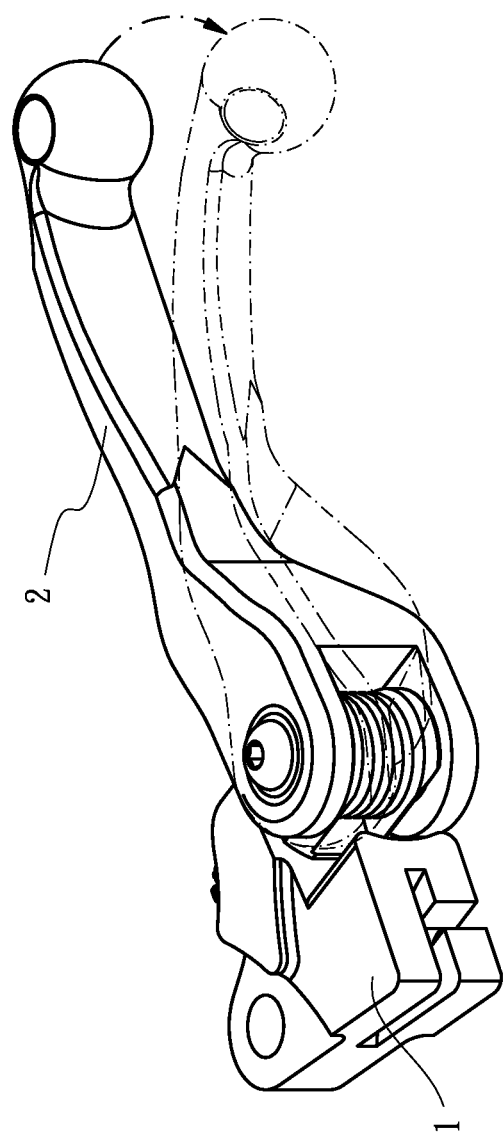

Referring to FIGS. 1-3, a pivoting structure in accordance with the present invention comprises a connector 1, a brake lever 2 and a pivoting set 3. One end of the connector 1 is connected to a handle (not shown) of a bicycle or a motorcycle. Another end of the connector 1 has an assembling space 11 opened thereon. One end of the brake lever 2 is defined as two pivoting members 21. Another end of the brake lever 2 is formed as ball-shaped and is bent outwardly relative to a user (as shown in FIG. 1) so as to prevent another end of the brake lever 2 from abutting against the user directly and further hurting the user. One distance is defined between the two pivoting members 21 (as shown in FIG. 2). The two pivoting members 21 are assembled to the assembling space 11. The brake lever 2 is pivoted on the connector 1 via the pivoting set 3. The pivoting set 3 has a horizontal shaft 31 and a vertical shaft 32. One end of the horizontal shaft 31 is inserted through a wall of the assembling space 11. The horizontal shaft 31 is rotatable relative to the wall of the assembling space 11. The vertical shaft 32 passes through the two pivoting members 21 of the brake lever 2 and is assembled between the two pivoting members 21. The brake lever 2 is rotatable relative to the vertical shaft 32. Another end of the horizontal shaft 31 is connected to the vertical shaft 32 between the two pivoting members 21. Therefore, two pivoting members 21 are assembled to the assembling space 11 and the brake lever 2 is pivoted on the connector 1 via the pivoting set 3. Under this arrangement, when the bicycle is tipped down by accident, although the brake lever 2 of the bicycle would abut against the ground forcefully, the pivoting structure for the brake lever would not be broken because of the pivoting set 3. The above description is enough to perform the first embodiment of the present invention.

Referring to FIGS. 4-8 and 8a-8c, the detailed performance of the pivoting structure for a brake lever of the present invention is further described as following:

1. The brake lever 2 is horizontally pivotable on the connector 1 via the vertical shaft 32 which is vertically assembled; the horizontal pivoting range of the brake lever 2 is limited by the assembling space 11.

2. The brake lever 2 is vertically pivotable on the connector 1 via the horizontal shaft 31 which is horizontally assembled and is connected to the vertical shaft 32 between the two pivoting members 21; the vertical pivoting range of the brake lever 2 is limited by the assembling space 11.

3. The brake lever 2 is further horizontally pivotable and vertically pivotable at the same time via the horizontal shaft 31 and the vertical shaft 32, so that when the bicycle is tipped down by the unexpected force, the pivoting structure for a brake lever of the present invention would not be further broken even though the direction of a abutting force from the ground is not vertical to the brake lever 2 or horizontal to the brake lever 2.

Furthermore, referring to FIG. 2, a concave space 12 is opened on the wall of the assembling space 11. The concave space 12 is corresponding to one end of the horizontal shaft 31. The concave space 12 is used to secure the horizontal shaft 31 to the connector 1 when the brake lever 2 is pivoted (the shape of the concave space 12 is not limited but is corresponding to the horizontal shaft 31 in the present invention; how to secure the horizontal shaft 31 to the connector 1 via the concave space 12 is not the main purpose of the present invention so that it would not be further described).

Referring to FIGS. 1-3, another end of the horizontal shaft 31 is defined as two pivoting units 311. Another distance is defined between the two pivoting units 311. The distance between the two pivoting units 311 is shorter than the distance between the two pivoting members 21 of the brake lever 2. The two pivoting units 311 of the horizontal shaft 31 are fitly assembled between the two pivoting members 21 of the brake lever 2. Therefore, the two pivoting units 311 of the horizontal shaft 31 are secured between the two pivoting members 21 of the brake lever 2.

Referring to FIGS. 1-8, the pivoting set 3 further has a plurality of bearings 33, a connecting screw 34, a vertical spring 35 and a horizontal spring 38. Two of the bearings 33 are respectively assembled on the two pivoting members 21 of the brake lever 2 and further respectively sleeve two ends of the vertical shaft 32. Another bearing 33 is assembled on the wall of the assembling space 11 and further sleeves one end of the horizontal shaft 31. Therefore, one end of the horizontal shaft 31 is secured to the connector 1 firmly and the vertical shaft 32 is secured between the two pivoting members 21 firmly via the bearings 33. The connecting screw 34 is screwed to a bottom end of the vertical shaft 32 to prevent the vertical shaft 32 from axially moving between the two pivoting members 21. The horizontal spring 38 sleeves one end of the horizontal shaft 31. The vertical spring 35 sleeves the vertical shaft 32 between the two pivoting members 21. Therefore, the vertical spring 35 and the horizontal spring 38 provide the recovery forces to pivot the brake lever 2 back to an original position after the brake lever 2 is pivoted. Two sleeving rings 36 sleeve one end of the horizontal shaft 31 and respectively abut against two ends of the horizontal spring 38. The sleeving rings 36 are used to prevent the horizontal shaft 31 from axially moving when the brake lever 2 is pivoted. The sleeving rings 36 are further used to prevent the horizontal spring 38 from axially moving on the horizontal shaft 31 when the brake lever 2 is pivoted (the shape of the sleeving rings 36 and how to assemble the sleeving rings 36 to the horizontal shaft 31 are not limited in the present invention).

Referring to FIG. 2, an adjusting screw 37 is assembled between the two pivoting members 21 of the brake lever 2. One end of the adjusting screw 37 is set on the brake lever 2. Another end of the adjusting screw 37 abuts against another end of the horizontal shaft 31. The adjusting screw 37 is used to adjust the distance between the brake lever 2 and a handle of the bicycle (not shown). Therefore, the distance between the brake lever 2 and the handle can be adjusted to fit the different size palms of the different users.

Figure 9:
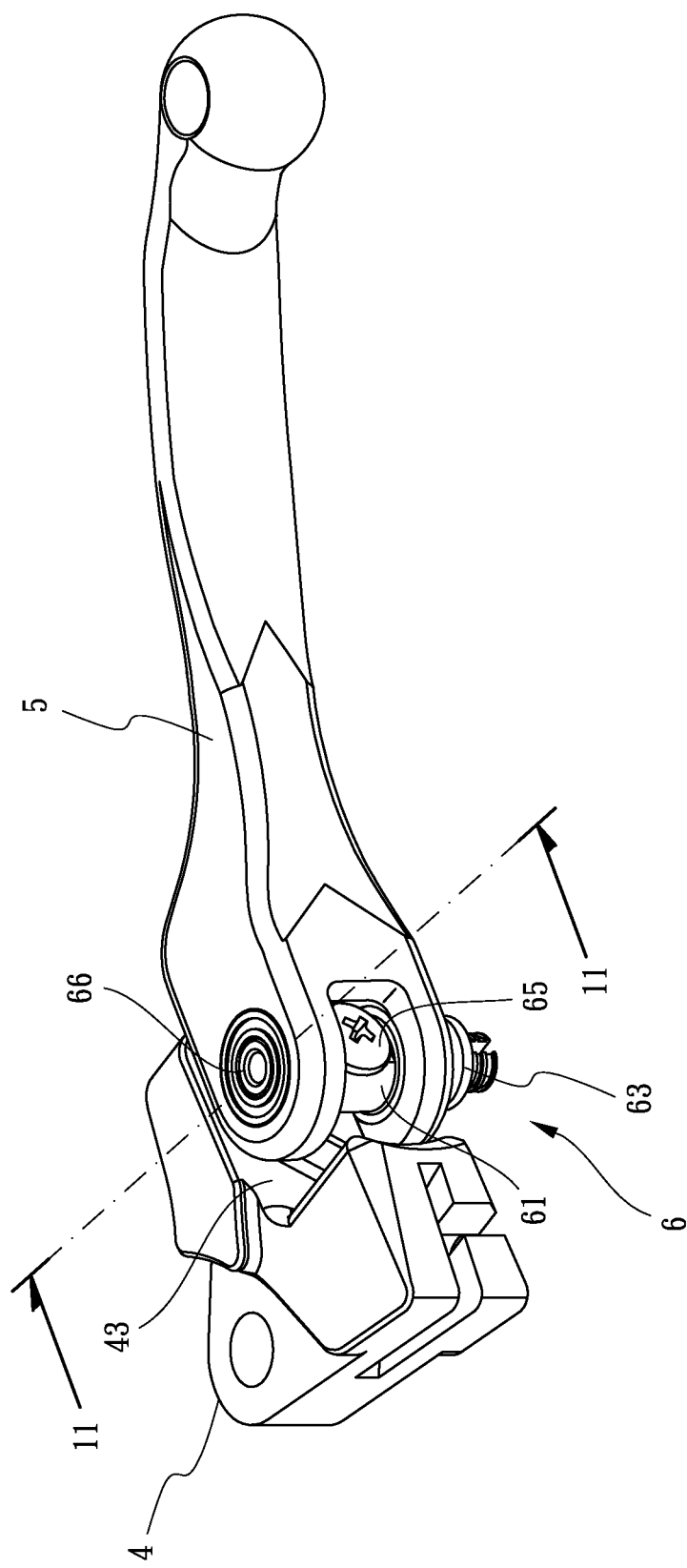
FIG. 9 is a perspective view of a pivoting structure for a brake lever of the second embodiment of the present invention.
Figure 10:
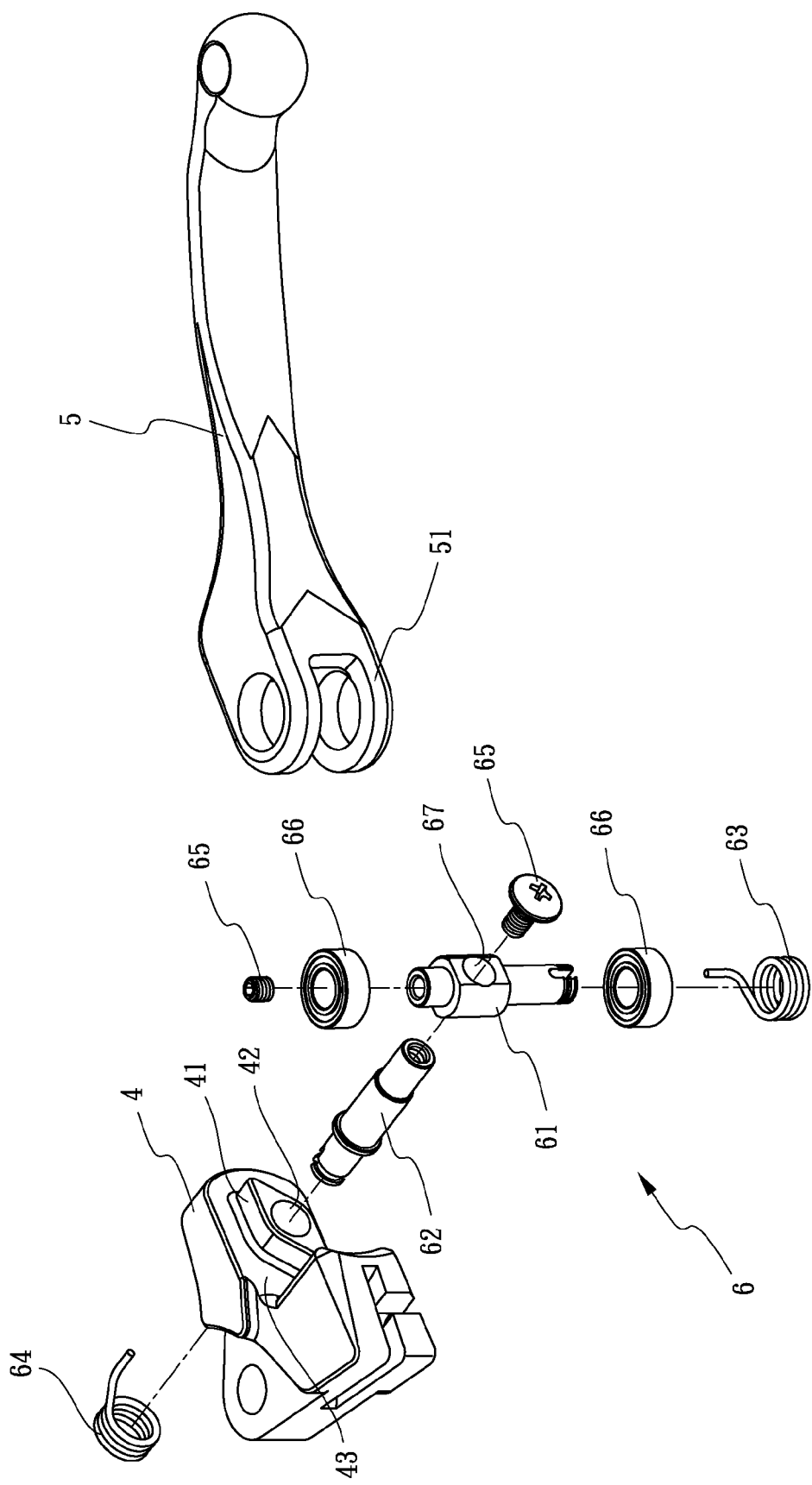
FIG. 10 is an exploded view of the pivoting structure for a brake lever of the second embodiment of the present invention.
Figure 11:
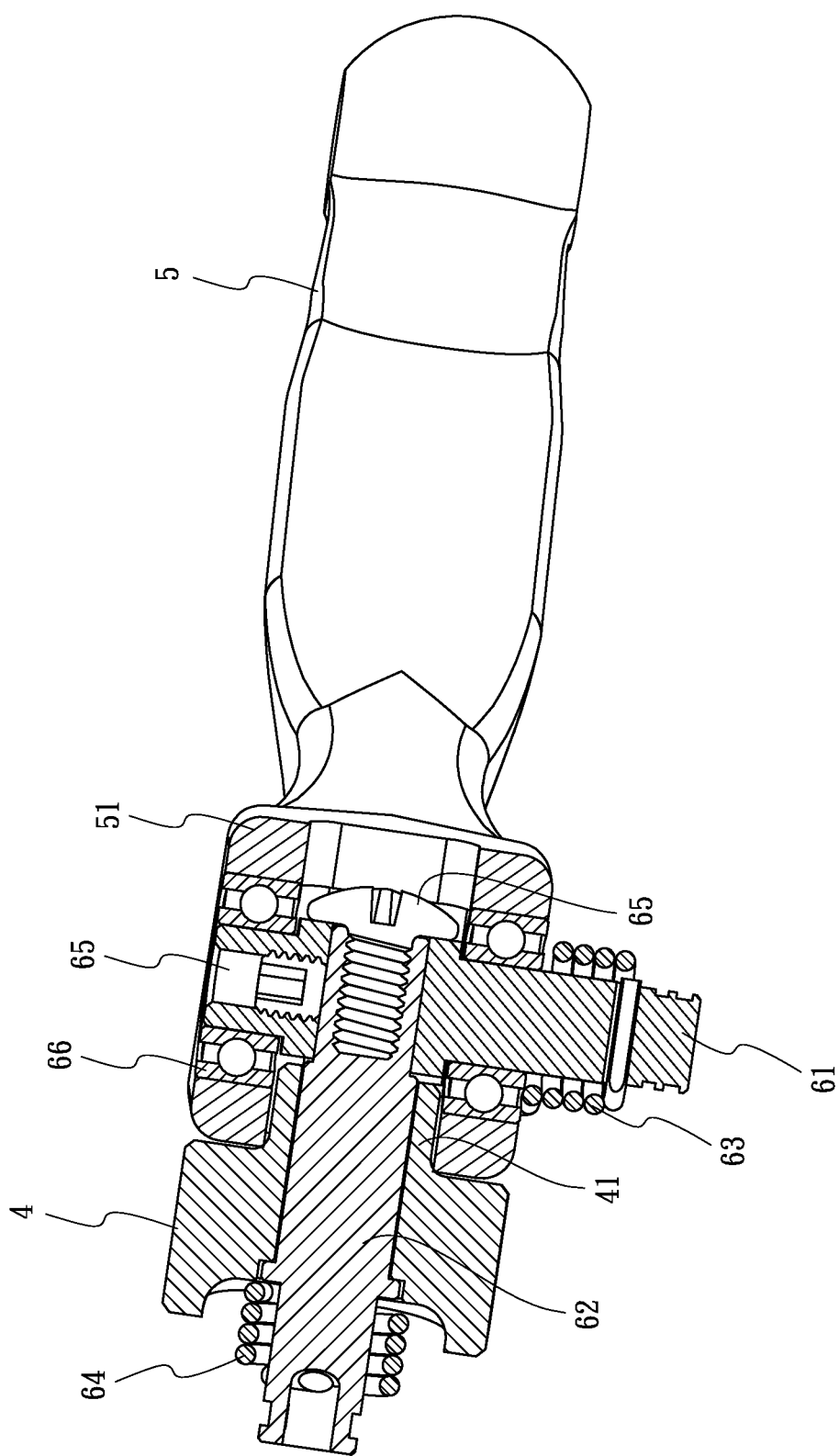
FIG. 11 is a cross-sectional view along a line 11-11 in FIG. 9 for showing a relationship between a connector, a brake lever and a pivoting set of the second embodiment.

Referring to FIGS. 9-11, the second embodiment of the present invention is described as following. A pivoting structure for a brake lever in accordance with the present invention comprises a connector 4, a brake lever 5 and a pivoting set 6. The brake lever 5 is pivoted on the connector 4 via the pivoting set 6. The connector 4 has an assembling space 43. A first through hole 42 is opened on a wall of the assembling space 43. One end of the brake lever 5 is defined as two pivoting members 51. A distance is vertically defined between the two pivoting members 51. The pivoting set 6 has a vertical shaft 61, a horizontal shaft 62, a vertical spring 63 and a horizontal spring 64. The vertical shaft 61 passes through the two pivoting members 51 of the brake lever 5 and one end of the vertical shaft 61 is extended from one pivoting member 51. The brake lever 5 is rotatable relative to the vertical shaft 61. A second through hole 67 is opened on the middle portion of the vertical shaft 61 between the two pivoting members 51. One end and another end of the horizontal shaft 62 are respectively inserted through the first through hole 42 of the connector 4 and the second through hole 67 of the vertical shaft 61. One end of the horizontal shaft 62 is extended from the first through hole 42 of the connector 4. The vertical spring 63 sleeves one end of the vertical shaft 61. One end of the vertical spring 63 is connected to one pivoting member 51. The horizontal spring 64 sleeves one end of the horizontal shaft 62. One end of the horizontal spring 64 is connected to the connector 4.

Under this arrangement, the second embodiment can perform as the first embodiment (as FIGS. 4-8). When the brake lever 5 is vertically pivoted or is horizontally pivoted, the horizontal spring 64 or the vertical spring 63 is twisted. After the brake lever 5 is vertically pivoted or is horizontally pivoted, the horizontal spring 64 or the vertical spring 63 provides a recovery force to pivot the brake lever 5 back to an original position.

Referring to FIGS. 10-11, two bearings 66 are respectively assembled on the two pivoting members 51. The two bearings 66 further respectively sleeve two ends of the vertical shaft 61. Two connecting screws 65 are respectively inserted into another end of the vertical shaft 61 and another end of the horizontal shaft 62 so as to strengthen a structure of the pivoting set 6.

Furthermore, an extruded part 41 is extruded from the wall of the assembling space 43. The first through hole 42 is opened on the extruded part 41. The extruded part 41 is used to limit the vertical pivoting range of the brake lever 5.

Figure 12:
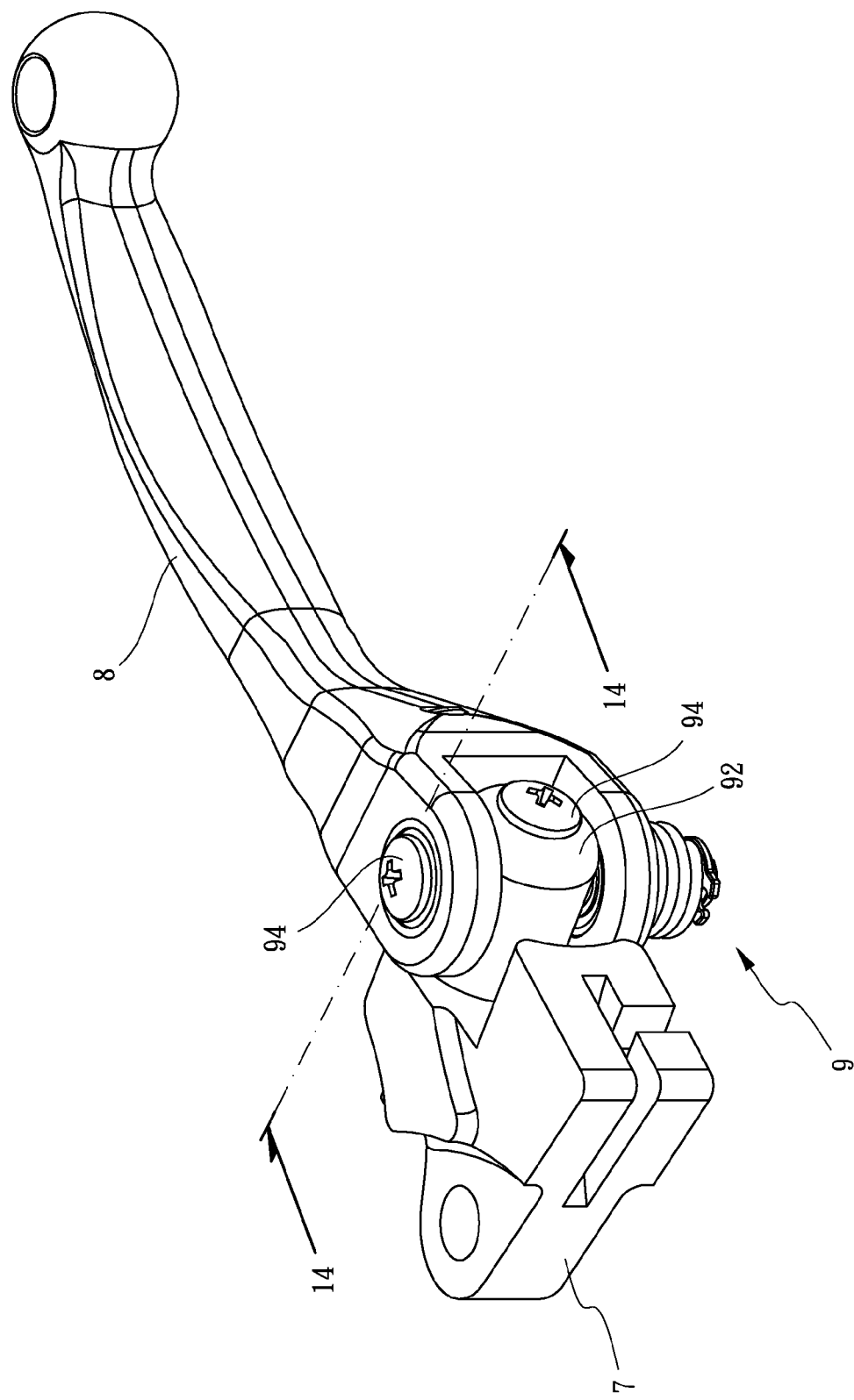
FIG. 12 is a perspective view of a pivoting structure for a brake lever of the third embodiment of the present invention.
Figure 13:
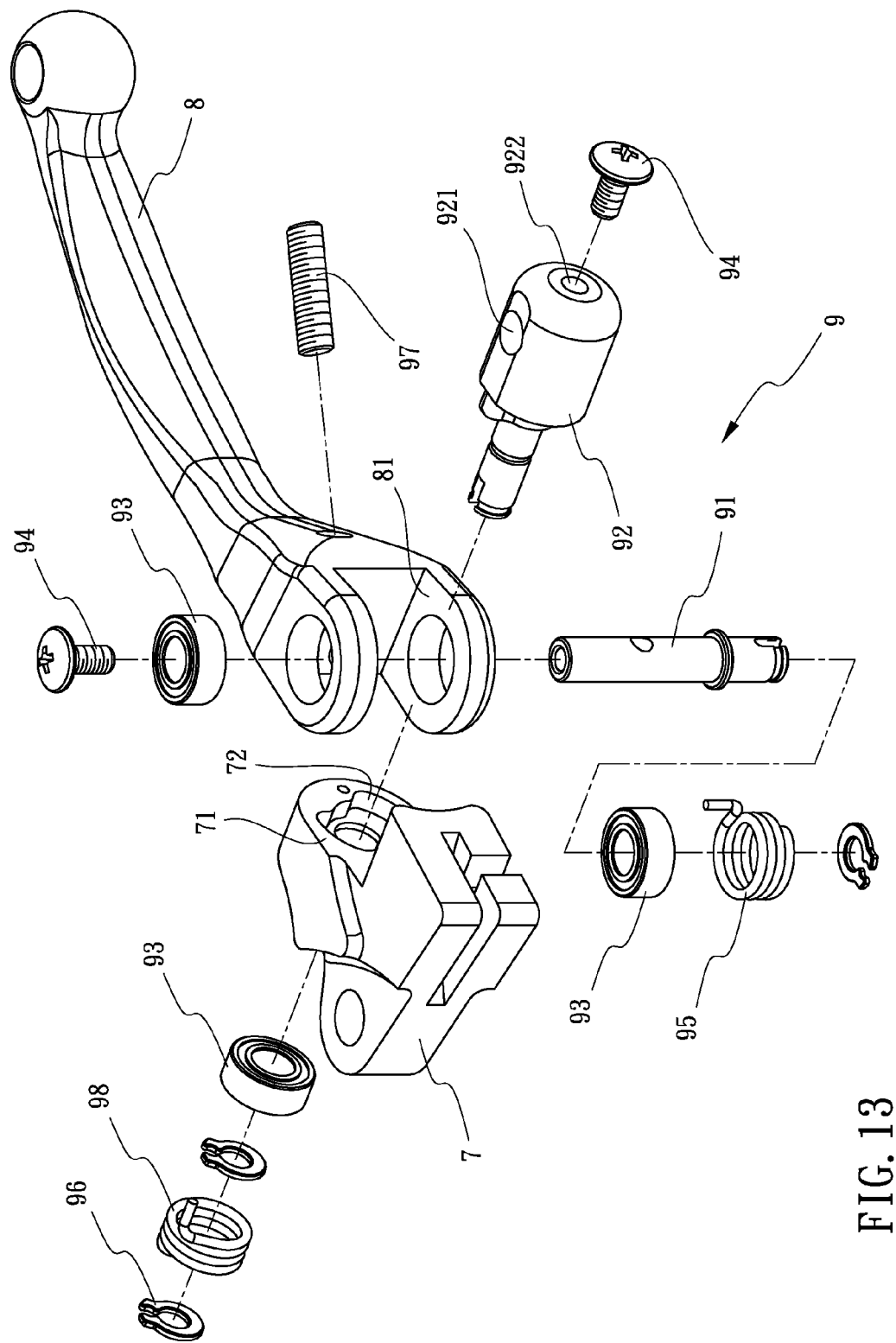
FIG. 13 is an exploded view of the pivoting structure for a brake lever of the third embodiment of the present invention.
Figure 14:
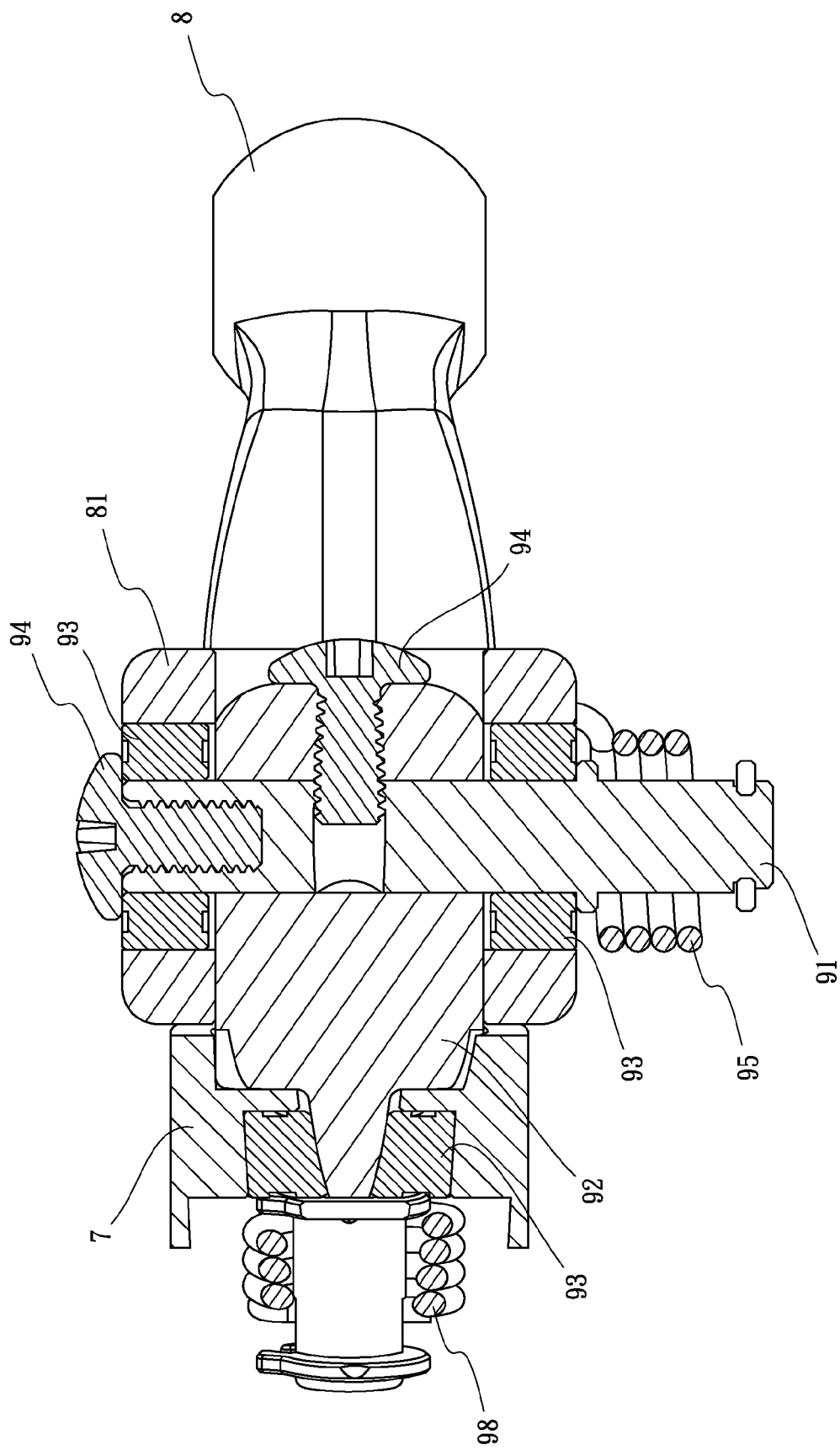
FIG. 14 is a cross-sectional view along a line 14-14 in FIG. 11 for showing a relationship between a connector, a brake lever and a pivoting set of the third embodiment.

Referring to FIGS. 12-14, the third embodiment of the present invention is described as following. A pivoting structure for a brake lever in accordance with the present invention comprises a connector 7, the brake lever 8 and a pivoting set 9. One end of the connector 7 is connected to a handle (not shown) of a bicycle or a motorcycle. Another end of the connector 7 has a assembling space 71 opened thereon. One end of the brake lever 8 is defined as two pivoting members 81. One distance is defined between the two pivoting members 81 (as shown in FIG. 13). The two pivoting members 81 are assembled to the assembling space 71. The brake lever 8 is pivoted on the connector 7 via the pivoting set 9. The pivoting set 9 has a vertical shaft 91 and a horizontal shaft 92. One end of the horizontal shaft 92 is inserted through a wall of the assembling space 71. The horizontal shaft 92 is rotatable relative to the wall of the assembling space 11. Another end of the horizontal shaft 92 is assembled between the two pivoting members 81. A vertical hole 921 is opened on another end of the horizontal shaft 92 therethrough. The vertical hole 921 is corresponding to each pivoting member 81. One end of the vertical shaft 91 is inserted through the pivoting members 81 of the brake lever 8 and the vertical hole 921 of the horizontal shaft 92 and is assembled between the two pivoting members 81 so that another end of the horizontal shaft 92 is connected to the vertical shaft 91 between the two pivoting members 81. Another end of the vertical shaft 91 is extended from one pivoting member 81. The brake lever 8 is rotatable relative to the vertical shaft 91. Therefore, the two pivoting members 81 are assembled to the assembling space 71 and the brake lever 8 is pivoted on the connector 7 via the pivoting set 9. Under this arrangement, the above description of the third embodiment is enough to perform as the first embodiment (as FIGS. 4-8).

Furthermore, referring to FIG. 13, a concave space 72 is opened on the wall of the assembling space 71. The concave space 72 is corresponding to one end of the horizontal shaft 92. The concave space 72 is used to secure the horizontal shaft 92 to the connector 7 when the brake lever 8 is pivoted (the shape of the concave space 72 is not limited but is corresponding to the horizontal shaft 92 in the present invention; how to secure the horizontal shaft 92 to the connector 7 via the concave space 72 is not the main purpose of the present invention so that it would not be further described).

Referring to FIGS. 13-14, another end of the horizontal shaft 92 is fat enough to abut against the two pivoting members 81. Therefore, another end of the horizontal shaft 92 is secured between the two pivoting members 81 of the brake lever 8. The pivoting set 9 further has a plurality of bearings 93, two connecting screw 94, a vertical spring 95 and a horizontal spring 98. Two of the bearings 93 are respectively assembled on the two pivoting members 81 of the brake lever 8 and further respectively sleeve two ends of the vertical shaft 91. Another bearing 93 is assembled on the wall of the assembling space 71 and further sleeves one end of the horizontal shaft 92. Therefore, one end of the horizontal shaft 92 is secured to the connector 7 firmly and the vertical shaft 91 is secured between the two pivoting members 81 firmly via the bearings 93. A horizontal hole 922 is opened at a bottom of the horizontal shaft 92. The horizontal hole 922 communicates with the vertical hole 921. One connecting screw 94 is inserted into the horizontal hole 922 to be screwed to the vertical shaft 91 so as to secure to the vertical shaft 91 to the horizontal shaft 92. Another connecting screw 94 is screwed into a top of the vertical shaft 91 so as to prevent the vertical shaft 91 from axially moving. The horizontal spring 98 sleeves one end of the horizontal shaft 92. The vertical spring 95 sleeves another end of the vertical shaft 91. Therefore, the vertical spring 95 and the horizontal spring 98 provide the recovery forces to pivot the brake lever 8 back to an original position after the brake lever 8 is pivoted. Two sleeving rings 96 sleeve one end of the horizontal shaft 92 and respectively abut against two ends of the horizontal spring 98. The sleeving rings 96 are used to prevent the horizontal shaft 92 from axially moving when the brake lever 8 is pivoted. The sleeving rings 96 are further used to prevent the horizontal spring 98 from axially moving on the horizontal shaft 92 when the brake lever 8 is pivoted (the shape of the sleeving rings 96 and how to assemble the sleeving rings 96 to the horizontal shaft 92 are not limited in the present invention).

Referring to FIG. 13, an adjusting screw 97 is assembled between the two pivoting members 81 of the brake lever 8. One end of the adjusting screw 97 is set on the brake lever 8. Another end of the adjusting screw 97 abuts against another end of the horizontal shaft 92. The adjusting screw 97 is used to adjust the distance between the brake lever 8 and a handle of the bicycle (not shown). Therefore, the distance between the brake lever 8 and the handle can be adjusted to fit the different size palms of the different users.

Although the invention has been explained in relation to its preferred embodiment, it is to be understood that many other possible modifications and variations can be made without departing from the spirit and scope of the invention as hereinafter claimed.

What is claimed is:

1. A pivoting structure comprising:
   a connector having an assembling space opened thereon;
   a brake lever for a bicycle, one end of the brake lever defined as two pivoting members, one distance defined between the two pivoting members, the two pivoting members assembled to the assembling space; and
   a pivoting set used to pivot the brake lever on the connector, the pivoting set having a horizontal shaft and a vertical shaft, a first end of the horizontal shaft inserted through a wall of the assembling space, the vertical shaft passing through the two pivoting members of the brake lever and assembled between the two pivoting members, a second end of the horizontal shaft connected to the vertical shaft between the two pivoting members;
   wherein the brake lever is vertically and horizontally pivotable via the pivoting set, so that when the bicycle is tipped down, although the brake lever of the bicycle would abut against the ground forcefully, the pivoting structure for the brake lever is prevented from being broken;
   wherein the pivoting set further has a plurality of bearings, a connecting screw, a vertical spring and a horizontal spring; two of the bearings are respectively assembled on the two pivoting members of the brake lever and further respectively sleeve two ends of the vertical shaft; another bearing is assembled on the wall of the assembling space and further sleeves the first end of the horizontal shaft; the connecting screw is screwed to a bottom end of the vertical shaft; the horizontal spring sleeves the first end of the horizontal shaft; the vertical spring sleeves the vertical shaft between the two pivoting members.

2. The pivoting structure as claimed in claim 1, wherein a concave space is opened on the wall of the assembling space; the concave space is corresponding to the first end of the horizontal shaft; the concave space is used to secure the horizontal shaft to the connector when the brake lever is pivoted.

3. The pivoting structure as claimed in claim 1, wherein the second end of the horizontal shaft is defined as two pivoting units; a distance is defined between the two pivoting units; the two pivoting units of the horizontal shaft are assembled between the two pivoting members of the brake lever.

4. The pivoting structure as claimed in claim 1, wherein two sleeving rings sleeve the first end of the horizontal shaft and respectively abut against two ends of the horizontal spring so as to prevent the horizontal shaft from axially moving when the brake lever is pivoted.

5. A pivoting structure comprising:
   a connector having an assembling space opened thereon;
   a brake lever for a bicycle, one end of the brake lever defined as two pivoting members, one distance defined between the two pivoting members, the two pivoting members assembled to the assembling space; and
   a pivoting set used to pivot the brake lever on the connector, the pivoting set having a horizontal shaft and a vertical shaft, a first end of the horizontal shaft inserted through a wall of the assembling space, the vertical shaft passing through the two pivoting members of the brake lever and assembled between the two pivoting members, a second end of the horizontal shaft connected to the vertical shaft between the two pivoting members;
   wherein the brake lever is vertically and horizontally pivotable via the pivoting set, so that when the bicycle is tipped down, although the brake lever of the bicycle would abut against the ground forcefully, the pivoting structure for the brake lever is prevented from being broken;
   wherein an adjusting screw is assembled between the two pivoting members of the brake lever; one end of the adjusting screw is set on the brake lever; another end of the adjusting screw abuts against the second end of the horizontal shaft; the adjusting screw is used to adjust the brake lever.

\* \* \* \* \*